United States Patent [19]

Oka et al.

[11] 4,263,657
[45] Apr. 21, 1981

[54] ELECTRONIC TRIP METER FOR AN AUTOMOTIVE VEHICLE

[75] Inventors: Takashi Oka, Tokyo; Hideoki Matsuoka, Yokohama; Masanori Mizote, Yokosuka; Kiyoshi Yamaki, Yokohama; Hiroyuki Nomura, Yokohama; Takaaki Mogi, Yokohama, all of Japan

[73] Assignee: Nissan Motor Company, Limited, Yokohama, Japan

[21] Appl. No.: 969,276

[22] Filed: Dec. 13, 1978

[30] Foreign Application Priority Data

Dec. 21, 1977 [JP] Japan .................................. 52-154880

[51] Int. Cl.³ ........................ G06M 3/02; G01C 22/00
[52] U.S. Cl. .................................... 364/561; 364/424; 235/92 DN; 235/95 R
[58] Field of Search ................ 364/561, 424, 432, 444, 364/446, 449; 235/92 DN, 92 PE, 92 MT, 95 R, 96, 97; 33/142; 73/490

[56] References Cited

U.S. PATENT DOCUMENTS

| | | | |
|---|---|---|---|
| 3,637,996 | 1/1972 | Seymour | 235/92 DN |
| 3,683,159 | 8/1972 | Welch et al. | 235/92 DN |
| 3,780,272 | 12/1973 | Rohner | 364/561 |
| 4,053,749 | 10/1977 | Shinoda et al. | 364/561 |
| 4,074,196 | 2/1978 | Webster | 235/92 PE |

*Primary Examiner*—Charles E. Atkinson
*Assistant Examiner*—Gary Chin

[57] ABSTRACT

An electronic trip meter for an automotive vehicle comprises an up-down counter, a memory circuit, an adder-subtractor, a display circuit, and other auxiliary circuits. The up-down counter produces a signal indicative of a remaining distance to a goal by subtracting an actually travelled distance from a preset distance between two points for displaying the remaining distance by the display circuit. When the vehicle reaches the goal, the adder-subtractor produces a signal indicative of the actually travelled distance in accordance with the output signals of the up-down counter and the memory circuit in which the preset distance is stored. The adder-subtractor output signal is then fed to the up-down counter for displaying the actual distance between the two points and to the memory circuit for correcting the preset distance whereby a remaining distance to the starting point in a return trip is easily and accurately obtained. The trip meter may be also utilized for a trip beyond the goal.

13 Claims, 3 Drawing Figures

ELECTRONIC TRIP METER FOR AN AUTOMOTIVE VEHICLE

FIELD OF THE INVENTION

The present invention generally relates to a trip meter for a motor vehicle. More particularly, the present invention relates to an electronic trip meter.

BACKGROUND OF THE INVENTION

Generally conventional type of trip meters are of the mechanical type. In such trip meters a mechanical counter including a numeral display device is driven via reduction gears by a drive shaft operatively connected to the transmission or other mechanism of the vehicle. When the driver of the vehicle intends to measure a distance between two points he will drive between, the driver resets the trip meter to zero so that the trip meter will count over the distance travelled, from zero. The trip meter is used not only for merely measuring the travelled distance but also for estimating the remaining distance to a goal or an objective point when the driver is aware of the distance between the two points, i.e. the starting point and the objective point. In order to ascertain the remaining distance on the way to the objective point the driver, however, must subtract the actually travelled distance which is displayed from the known distance by mental calculation.

For eliminating the inconvenience of such mental calculations, a trip meter which displays the remaining distance is desirable. Such a trip meter can be easily imagined since it is possible to ascertain the remaining distance by reducing a preset distance (numerals) in an opposite manner thereby subtracting the actually travelled distance from a preset distance. Although this type of a trip meter is convenient while the actually travelled distance does not exceed the preset distance, it is troublesome for the driver to ascertain the actual distance travelled if the distance exceeds the distance preset in the meter since he must add the distance corresponding to the excess to the preset distance. Moreover, if the preset distance is radically different from the actually travelled distance, the vehicle driver may not be able to determine if the displayed distance indicates the remaining distance or the excess of the distance. Therefore, such a trip meter which displays only the remaining distance cannot satisfy all of the present day driver needs.

SUMMARY OF THE INVENTION

The present invention has been developed in order to overcome the above mentioned drawbacks of the conventional type trip meters.

According to the present invention an electronic trip meter which comprises an up-down counter, a memory circuit, an adder-subtractor, a display circuit and other circuits such as a travelled distance sensing circuit and logic gates, is provided. The up-down counter produces a signal indicative of the difference between a distance actually travelled by the vehicle and a preset distance so that a remaining distance to an objective point of a predetermined course or an excess distance over the preset distance is obtained. The display circuit displays a distance represented by the output signal of the up-down counter. The display circuit further displays a sign which indicates whether the distance displayed is of the remaining distance or the excess distance in accordance with the relationship between the actually travelled distance and the preset distance.

The preset distance is stored in the memory circuit while the adder-subtractor is responsive to the output signals of the up-down counter and the memory circuit. The adder-subtractor produces an output signal indicative of an actually travelled distance. The adder-subtractor output signal is then fed to the input of the up down counter and the memory circuit so that the actually travelled distance between the starting point and the objective point is displayed by the display circuit. With this arrangement the stored signal indicative of the known distance is taken place by the output signal of the adder-subtractor indicative of an actual distance. The actual distance may be utilized for a return trip or another trip beyond the first objective point.

It is therefore, an object of the present invention to provide an electronic trip meter for a vehicle in which the remaining distance to be travelled before reaching an objective point is easily obtained.

Another object of the present invention is to provide such a trip meter in which, when the distance actually travelled is greater than the distance preset into the trip meter, the excess distance is easily ascertained.

Further object of the present invention is to provide such a trip meter in which an actually travelled distance is easily ascertained.

Yet another object of the present invention is to provide such a trip meter in which stored preset distance is corrected by the actually travelled distance if the preset distance is erroneous.

BRIEF DESCRIPTION OF THE DRAWINGS

These and other objects and features of the present invention will become more readily apparant from the following detailed description of the peferred embodiments taken in conjunction with the accompanying drawings in which.

DETAILED DESCRIPTION OF THE PREFERRED EMBODIMENTS

Figure 1:
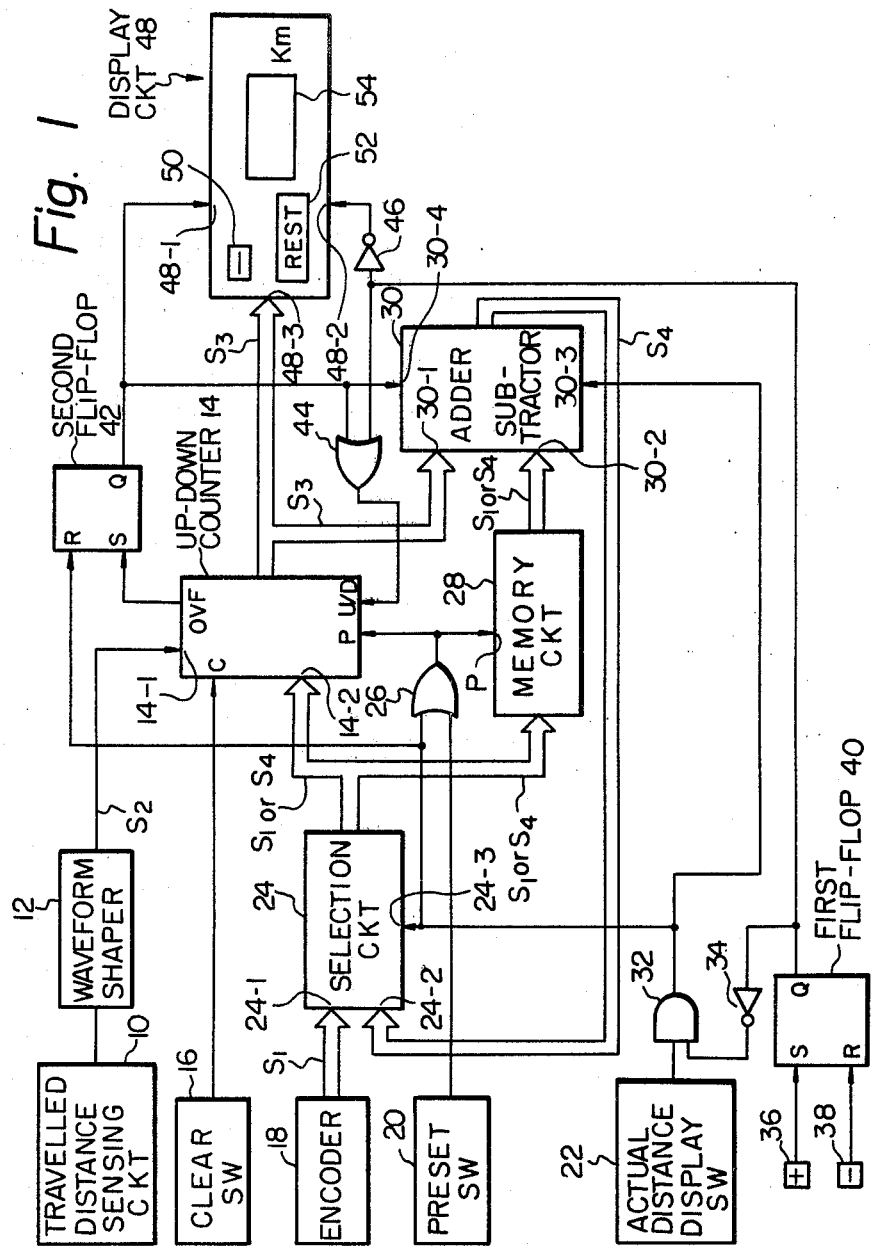
FIG. 1 shows in a block diagram form a first preferred embodiment of the trip meter according to the present invention.

FIG. 1 illustrates in block diagram form a first preferred embodiment of the trip meter according to the present invention. The circuitry arrangement of the trip meter includes a travelled distance sensing circuit 10, a waveform shaper 12, a presettable up-down counter 14, a clear switch 16, an encoder 18, a reset switch 20, an actual distance display switch 22, a selection circuit 24, a first OR gate 26, a memory circuit 28, an adder-subtractor 30, an AND gate 32, a first NOT gate 34, an adding switch 36, a subtracting switch 38, a first flip-flop 40, a second flip-flop 42, a second OR gate 44, a second NOT gate 46, and a display circuit 48.

The travelled distance sensing circuit 10 includes a pulse signal generator (not shown) which generates a pulse signal each time the vehicle travels a pre-determined unit distance. The pulse signal generator may be operatively connected to a drive shaft of the transmission (not shown) or to the odometer (not shown) of the vehicle. The output of the travelled distance sensing circuit 10 is connected to an input of the waveform shaping circuit 12, such as a schmitt trigger circuit, which produces a pulse signal having a logic level in response to the pulse signal applied from the travelled distance sensing circuit 10. The output of the waveform shaping circuit 12 is connected to a first input 14-1 of the up-down counter 14. The clear switch 16 is of a manual type switch and is connected to a clear terminal "C" of the up-down counter 14. The encoder 18 consists of a keyboard and a decimal-binary converter such as a BCD (binary-coded decimal) circuit (not shown). The outputs of the encoder are connected to first inputs 24-1 of the selection circuit 24, where the connections thereof are shown by a thick directed line which indicates a plurality of wires. Other thick directed lines shown in FIG. 1 respectively indicate a plurality of wires in the same manner. The encoder 18 is utilized for setting a known distance, which may be obtained from a map, to be travelled. The vehicle driver operates the keyboard of the encoder 18 to set the known distance before he starts from a starting point. The selection circuit 24 has a second input 24-2 to which another signal indicative of a different distance, which will be described later, is applied, and an output which is connected to a second input 14-2 of the up-down counter 14 and to an input of the memory circuit 28. The selection circuit 24 selectively supplies one of the input signals to the up-down counter 14 and to the memory circuit 28 in response to a selection command signal applied to the control terminal 24-3 thereof.

The preset switch 20 and the actual distance display switch 22 are respectively of the type of manual switches and are respectively connected to a second input of the first OR gate 26 and to a first input of the AND gate 32. The adding switch 36 and the subtracting switch 38 are also respectively manual type switches and are respectively connected to a set terminal "S" and a reset terminal "R" of the first flip-flop 40. Each of the above mentioned five switches, i.e. the clear switch 16, the preset switch 20, the actual distance diisplay switch 22, the adding switch 36, and the subtracting switch 38, is arranged to produce an output logic "1" pulse when operated. The output "Q" of the first flip-flop 40 is connected to an input of the first NOT gate the output of which is connected to a second input of the AND gate 32. The output "Q" of the first flip-flop 40 is further connected to an input of the second NOT gate 46 and to a second input of the second OR gate 44. The output of the AND gate 32 is connected to the control terminal 24-3 of the selection circuit 24, to a second input of the first OR gate 26, to a reset terminal "R" of the second flip-flop 42, and to a subtracting control terminal 30-3 of the adder-subtractor 30. The output of the first OR gate 26 is connected to a preset control terminal "P" of the up-down counter 14 and to a preset control terminal "P" of the memory circuit 28.

An overflow output terminal "OVF" of the up-down counter 14 is connected to a set terminal "S" of the second flip-flop 42 the output "Q" of which is connected to an adding control terminal 30-4 of the adder-subtractor 30 and to a first input 48-1 of the display circuit 48. The output "Q" of the second flip-flop 42 is further connected to a first input of the second OR gate 44 the output of which is connected to an up-down control terminal U/D of the up-down counter 14. The output terminal of the up-down counter 14 is connected to a first input 30-1 of the adder-subtractor 30 and to third input 48-3 of the display circuit 48. The output of the memory circuit 28 is connected to a second input 30-2 of the adder-subtractor 30 the output of which is connected to a second input 24-2 of the selection circuit 24. The output of the second NOT gate 46 is connected to a second input 48-2 of the display circuit 48.

The functions and operations of the first preferred embodiment of the trip meter shown in FIG. 1 will be described hereinbelow. When the known dstance $D_1$ is set in the encoder 18, the encoder produces an output signal $S_1$ indicative of the known distance $D_1$. The signal $S_1$ is applied via the selection circuit 24, when the control terminal 24-3 thereof is supplied with a logic "0" signal, to the up-down counter 14 and to the memory circuit 28. Since the actual distance display switch 22 normally produces a logic "0" signal which is supplied to the first input of the AND gate 32, the AND gate 32 provides a logic "0" signal to the control terminal 24-3 of the selection circuit 24, and other circuits connected thereto. When no pulse is applied to the first input 14-1 of the up-down counter 14, the signal $S_1$ is transferred to the output thereof so that the preset distance $D_1$ is displayed at the third display portion 54 of the display circuit 48. The clear switch 16 and the preset switch 20 normally produce logic "0" signals and thus the logic "0" signals are respectively applied to the clear terminal "C" of the up-down counter 14 and to the second input of the first OR gate 26.

When the vehicle is at a starting point, the vehicle driver operates the subtracting switch 38 so that a logic "1" pulse signal is applied to the reset terminal "R" of the first flip-flop 40 to obtain a logic "0" signal at the output "Q" of the same. The logic "0" signal is applied to the second input of the second OR gate 44, to the first NOT gate 34, and to the second NOT gate 46. The second NOT gate 46 converts the logic "0" signal into a logic "1" signal so that the second input 48-2 of the display circuit 48 is supplied with the logic "1" signal. The display circuit 48 includes first, second and third display portions 50, 52 and 54. The first display portion 50 displays "—" sign when the first input 48-1 is supplied with a logic "1" signal, the second display portion 52 displays "REST" sign when the second input 48-2 is supplied with a logic "1" signal, and the third display portion 54 displays numerals in accordance with a signal $S_3$ applied to the third input 48-3.

The second flip-flop 42 is arranged to produce a logic "1" signal at the output thereof when a logic "1" signal indicative of the overflow of the up-down counter 14 is applied from the overflow output terminal "OVF" of the up-down counter 14 to the set terminal "S" of the second flip-flop 42. The logic "1" signal indicative of the overflow is referred to as an over flow signal and is produced when the number of pulses applied to the first input 14-1 exceeds a number which corresponds to a distance represented by the signal applied to the second input 14-2 of the same. Since both of the inputs of the second OR gate 44 are fed with logic "0" signals, the second OR gate 44 produces a logic "0" signal accordingly with which the up-down counter 14 functions as a down (subtracting) counter. As mentioned before, the first input 14-1 of the up-down counter 14 is supplied with a signal $S_2$ which is a train of pulses produced as the vehicle travels. The number of the pulses indicates an actually travelled distance $D_2$. Assuming the signal $S_1$ indicates the known distance $D_1$, the up-down counter 14 produces an output signal $S_3$ indicative of the difference $D_1-D_2$ between the two distances $D_1$ and $D_2$. The output signal $S_3$, therefore, indicates the remaining distance $D_3$ to the goal or an objective point with respect to the actually travelled distance $D_2$. The signal $S_3$ is fed to the adder-subtractor 30 and to the display circuit 48 so that the remaining distance $D_3$, i.e. $D_1-D_2$, is displayed in a form of numerals at the third display portion 54 of the display circuit 48 while the sign of "REST" is also shown at the second display portion 52. If the preset distance, i.e. the known distance $D_1$, for example, between the starting point and the goal is 100 Km, 100 is displayed at the third display portion 54 when the vehicle is at the starting point. When the vehicle has actually travelled as far as 70 Km, 30 is displayed at the same as the remaining distance $D_3$. Simultaneously, the "REST" sign is also displayed at the second display portion 52. Although the above shown numerals are numbers occupying the position the left of the decimal, it is preferable that the displayed numbers be accurate to the first or second decimal place.

The above mentioned function of the trip meter occurs continuously so that the numerals indicative of the remaining distance $D_3$ at the third display portion 54 keeps decreasing. If the preset known distance $D_1$ equals the actual distance Da between the starting point and the objective point, the numerals at the third display portion 54 of the display circuit 54 becomes "0" Km when the vehicle has reached the objective point since the known distance $D_1$ and the actually travelled distance $D_2$ are the same.

However, the preset known distance $D_1$ is not necessarily the same as the actual distance Da. Distances shown on maps are sometimes erroneous. Further, the vehicle driver may change route on the way to the goal so that the actual distance Da differs from the preset distance $D_1$. There are two possibilities of the deviation of the actual distance Da from the preset distance $D_1$. The first possibility is that the actual distance Da is shorter than the preset distance $D_1$ while the second possibility is that the actual distance Da is longer than the preset distance $D_1$. In the former case the "REST" sign at the second display portion 52 and numerals indicative of the difference $D_1-D_2$ at the third display portion 54 are respectively displayed even though the vehicle has reached the objective point. For example, if the actually travelled distance as far as the objective point is 96 Km upon the set of 100 Km as the known distance, the difference, i.e. 4 Km as well as the "REST" sign are displayed at the display circuit 48, when the vehicle reaches the objective point. This means that the preset known distance $D_1$ is erroneous, viz. longer than the actual distance Da. In such a case the vehicle driver operates the actual distance display switch 22 to produce a logic "1" pulse signal at the output thereof. The logic "1" pulse signal is then supplied to the first input of the AND gate 32 the second input of which is supplied with another logic "1" signal from the first NOT gate 34. Upon presence of logic "1" signals at the inputs thereof the AND gate 32 produces a logic "1" pulse signal at the output thereof which is supplied to the control terminal 24-3 of the selection circuit 24, to the first input of the first OR gate 26, to the reset terminal "R" of the second flip-flop 42, and to the subtracting control terminal 30-3 of the adder-subtractor 30. Upon presence of the logic "1" pulse signal at the subtracting control terminal 30-3 the adder-subtractor 30 starts functioning as a subtractor. Since the first and second inputs 30-1 and 30-2 of the adder-subtractor 30 have respectively been supplied with the signals $S_3$ and $S_1$ before the actual distance display switch 22 is operated, the adder-subtractor 30 produces an output signal $S_4$ indicative of the difference between distances $D_1$ and $D_3$ which are respectively indicated by the signals $S_1$ and $S_3$. When the vehicle arrives at the objective point, the actually travelled distance $D_2$ represented by the number of pulses of the signal $S_2$ corresponds to the actual distance Da between the starting point and the objective point. Namely, the output signal $S_4$ of the adder-subtractor 30 is indicative of the actual distance Da since $D_1-D_3=D_1-(D_1-Da)$. The output signal $S_4$ of the adder-subtractor 30 indicative of the actual distance Da which is the actually travelled distance between the two points, is then fed to the second input 24-2 of the selection circuit 24.

Upon presence of the logic "1" signal at the control terminal 24-3, the selection circuit 24 selects the signal $S_4$ instead of the signal $S_1$. Therefore, the signal $S_4$ is then fed to the second input 14-2 of the up-down counter 14 and to the input of the memory circuit 28. Simultaneously the logic "1" signal produced by the AND gate 32 is fed via the first OR gate 26 to the preset terminals "P" of the up-down counter 14 and the memory circuit 28 so that stored signals $S_1$ and $S_2$ in the up-down counter 14 and the stored signal $S_2$ in the memory circuit 28 are respectively cleared. After the above mentioned clearance, the signal $S_4$ indicative of the actual distance Da is respectively stored in the up-down counter 14 and the memory circuit 28. The stored signal $S_4$ is supplied to the third input 48-3 of the display circuit 48 from the up-down counter 14 so as to indicate the actual distance Da at the third display portion 54 of the same. Meanwhile the adder-subtractor 30 receives at the first and second inputs 30-1 and 30-2 thereof the same signals $S_4$ from the up-down counter 14 and the memory circuit 28.

In the previously described latter case, viz. actual distance Da is longer than the preset distance $D_1$, a logic "1" signal indicative of the overflow of the stored signal of the up-down counter 14 is produced at the overflow terminal "OVF" of the same to set the second flip-flop 42 when the vehicle has travelled as far as the preset distance $D_1$. Upon presence of the overflow signal the second flip-flop 42 produces a logic "1" output signal which is fed to the adding control terminal 30-4 of the adder-subtractor 30, to the up-down control terminal U/D of the up-down counter 14 via the second OR gate 44, and to the first input 48-1 of the display circuit 48. Accordingly, the minus sign "−" at the first display portion 50 of the display circuit 48 is displayed while the adder-subtractor starts functioning as an adder and the up-down counter 14 starts functioning as an up (adding) counter. Therefore, the numerals displayed at the third display portion 54 increases from zero as the vehicle keeps travelling toward the objective point. In other words, the output signal $S_3$ of the up-down counter 14, which previously indicated the remaining distance $D_3$ as far as the actually travelled distance $D_2$ becomes equal to the preset distance $D_1$, starts indicating the distance $D_4$ travelled in excess of the preset distance $D_1$.

As an example, assuming the preset distance is 100 Km and the vehicle has still not reached the objective point when the vehicle has travelled 100 Km because the actual distance Da between the starting point and the objective point is, in fact, 110 Km, the numeral at the third display portion 54 of the display circuit 48 becomes "0". Of course the displayed numerals "0" is erroneous since the vehicle is 10 Km from the objective point. After the numerals become "0", the numerals starts increasing like 1, 2, 3... When the vehicle finally reaches the objective point, the numerals indicate the actually travelled distance $D_4$, i.e. 10 Km while the "—" sign is also displayed at the first display portion 50. The "REST" sign is also displayed since the second input terminal 48-2 of the display circuit 48 keeps receiving logic "1" signal from the second NOT gate 46.

The vehicle driver operates the actual distance display switch 22 when the vehicle arrives at the objective point in the same manner as in the former case. Therefore, a logic "1" pulse signal produced by the AND gate 32 is delivered to the selection circuit 24, to the first OR gate 26, to the second flip-flop 42, and to the adder-subtractor 30 in the same manner. The adder-subtractor 30 functions as an adder since the first adding control terminal 30-4 of the same is fed with a logic "1" signal although the subtracting control terminal 30-3 is also fed with a logic "1" signal from the AND gate 32. This means that the adder-subtractor is arranged to function as adder whenever the adding control terminal 30-4 receives a logic "1" signal irrespectively of the signal applied to the subtracting control terminal 30-3. Since the first and second input terminals 30-1 and 30-2 of the adder-subtractor 30 are respectively fed with signals $S_3$ indicative of the actually travelled distance $D_4$, i.e. 10 Km, and $S_1$ indicative of the preset distance $D_1$, the adder-subtractor 30 produces an output signal $S_4$ indicative of the sum $D_5$ of the distances where the sum $D_5$ is expressed in terms of $D_1+D_4$, i.e. 110 Km in this example. The signal $S_4$ is then fed to the second input 24-2 of the selection circuit 24 so that the signal $S_4$ is fed to the up-down counter 14 and to the memory circuit 28 via the selection circuit 24 since the selection circuit 24 is responsive to the logic "1" signal applied to the control terminal thereof. As in the same manner as the former case the signals $S_1$ and $S_2$ stored in the up-down counter 14 and the signal $S_1$ stored in the memory circuit 28 are respectively cleared upon presence of the logic "1" pulse signal applied to the preset terminals "P" thereof via the first OR gate 26 from the AND gate 32. Then the newly provided signal $S_4$ indicative of the sum $D_5$ is respectively stored in the up-down counter 14 and the memory circuit 28. The signal $S_4$ indicative of the sum $D_5$ is forwarded to the display circuit 48 in the same manner so that the sum $D_5$, i.e. 110 Km is displayed at the third display portion 54 of the display circuit 48. The adder-subtractor 30 meanwhile receives the signal $S_3$ indicative of the sum $D_5$ and the signal $S_4$ also indicative of the sum $D_5$ at the first and second input terminals 30-1 and 30-2.

From the foregoing description it will be clearly understood that in the above mentioned both cases the trip meter according to the present invention displays the remaining distance $D_3$ until the actually travelled distance $D_2$ reaches the preset distance $D_1$. Further, the trip meter displays the excess distance, i.e. an actually travelled distance $D_4$ which the vehicle has travelled beyond the preset distance $D_1$ if the actual distance Da between the starting point and the objective point is longer than the preset distance $D_1$. Further, the trip meter displays the actual distance Da from the starting point to the objective point when the actual distance display switch 22 is operated at the objective point. The function of the trip meter is not limited to the display of the above mentioned various distances. Further features of the trip meter will be described hereinbelow.

The second feature of the trip meter resides in the fact that the trip meter may be utilized for a return trip if the vehicle returns to the starting point via the same rout from the objective point.

As described hereinabove, the third display portion 54 of the display circuit 48 displays the actual distance Da between the starting point and the objective point when the actual distance display switch 22 is operated. Since the actual distance Da between the starting point and the objective point, i.e. the actually travelled distance $D_2$, is stored in the up-down counter 14, the up-down counter 14 starts producing an output signal $S_3$ accurately indicative of the remaining distance to a new goal which is the original starting point by subtracting an actually travelled distance $D_2$ indicated by the signal $S_2$ from the actual distance Da indicated by the signal $S_4$. With this provision, if the vehicle returns to the original starting point via the same rout, the numeral at the third display portion 54 of the display circuit 48 is supposed to display "0" when the vehicle reachs the original starting point.

The third feature of the trip meter according to the present invention, resides in the fact that the trip meter may be utilized for measuring the actually travelled distance between the starting point and a second objective point which is beyond of the first objective point. When the vehicle driver intends to drive the vehicle toward a second objective point beyond the first objective point, he operates the adding switch 36 for producing a logic "1" signal at the output thereof. The logic "1" signal is applied to the set terminal "S" of the first flip-flop 40 to produce a logic "1" signal at the output terminal "Q" of the same. The logic "1" signal is then applied via the second OR gate 44 to the up-down control terminal U/D of the up-down counter 14. Meanwhile the logic "1" signal is inverted by the first and second NOT gates 34 and 46 so that logic "0" signals are respectively applied to the second input of the AND gate 32 and to the second input terminal 48-2 of the display circuit 48. With this arrangement, the up-down counter 14 starts functioning as an up(adding) counter. Since the signal $S_4$ indicative of the actual distance Da between the starting point and the first objective point is already stored in the up-down counter 14, the up-down counter 14 produces an output signal $S_3$ indicative of the distance between the starting point and the point at which the vehicle is travelling. In other words, the output signal $S_3$ of the up-down counter 14 indicates a distance which is expressed in terms of $Da+D_6$ wherein $D_6$ is a distance travelled after the vehicle passes the first objective point.

A table which shows the relationship among the above mentioned various distances is made hereinbelow for convenience.

Da: an actual distance between a starting point and a first objective point; (indicated by the signal $S_4$)

$D_1$: a preset distance between the starting point and the first objective point, which may be obtained from a map; (indicated by the signal $S_1$)

$D_2$: a distance actually travelled by the vehicle from the starting point, $D_2$ corresponds to Da when the vehicle reaches the first objective point; (indicated by the signal $S_2$)

$D_3$: a remaining destance expressed in terms of $D_1-D_2$; (indicated by the signal $S_3$)

$D_4$: an excessive distance, i.e. an actually travelled distance after the vehicle has travelled over the preset distance $D_1$; (indicated by the signal $S_3$)

$D_5$: a sum of the distances $D_1$ and $D_4$, $D_5$ corresponds to $D_a$ when the vehicle reaches the first objective point; (indicated by the signal $S_4$)

$D_6$: a distance actually travelled by the vehicle from the first objective point; (indicated by the signal $S_2$)

The fourth feature of the trip meter is that the signal stored in the up-down counter 14 may be cancelled whenever the vehicle driver wishes to do so by operating the clear switch 16. The clear switch 16 is arranged to produce a logic "1" pulse signal when operated which is supplied to the clear terminal "C" of the up-down counter 14. For instance, in case that the vehicle is at the first objective point and is going to leave for the second objective point, the vehicle driver may operate the clear switch 16 for cancelling the signal $S_4$ indicative of the actual distance $D_a$ between the starting point and the first objective point if the vehicle driver wants to see only the actually travelled distance between the first objective point and the second objective point. In such a case all the vehicle driver has to do is to operate the clear switch 16 and the adding switch 36.

The fourth feature of the trip meter is that the trip meter may be utilized for a plurality of preset distances. In order to preset a plurality of distances the memory circuit 28 should include a plurality of memory circuits.

Figure 2:
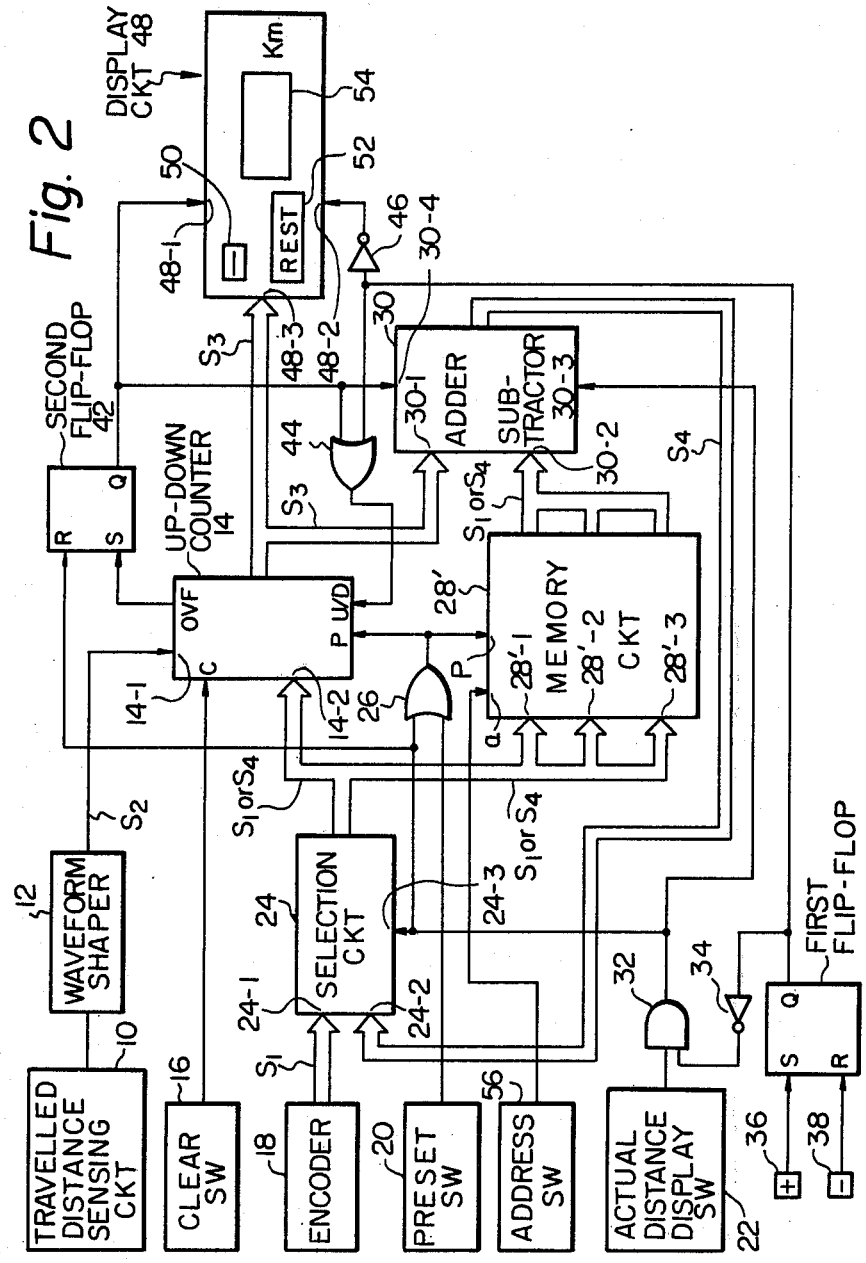
FIG. 2 shows in a block diagram form a second preferred embodiment of the trip meter according to the present invention.

Hence, reference is now made to FIG. 2 which shows a second preferred embodiment of the trip meter according to the present invention. The circuit arrangement of the second embodiment has the same construction as the first embodiment shown in FIG. 1 except that a memory circuit 28' includes a plurality of memory circuits (no numerals). In this embodiment the memory circuit 28' includes three addressed memories the input of which are designated by reference numerals 28'-1, 28'-2 and 28'-3 respectively and three read out circuits, such as buffer registers (not shown). The memory circuit 28' is arranged to write information applied to the input terminals 28'-1, 28'-2 and 28'-3 in an addressed memory. One addressed memory is selected among three addressed memories in accordance with a signal applied to an address terminal "a" of the memory circuit 28'. The address switch 56 is operated to produce three output signals with each of which a corresponding addressed memory is selected. An input signal is then stored in a selected addressed memory in response to a logic "1" signal applied to the preset terminal "P" of the memory circuit 28' from the first OR gate 26. The written information is read out respectively in the same manner in response to the signals applied to the address terminal "a" from the address switch 56.

If the vehicle driver is aware of three distances, such as a first distance $d_1$ between the starting point and a first objective point, a second distance $d_2$ between the first objective point and the second objective point, and a third distance $d_3$ between the second objective point and the third objective point, he presets these three distances $d_1$, $d_2$ and $d_3$ in the addressed memories of the memory circuit 28' by using the encoder 18, the address switch 56 and the preset switch 20. The vehicle driver operates the keyboard of the encoder 18 so as to encode the first distance $d_1$. After the first distance $d_1$ is encoded, the vehicle driver operates address switch 56 and the preset switch 20 so as to write the first distance $d_1$ in the first addressed memory. In the same manner the second and third distances $d_2$ and $d_3$ are successively written in the second and third addressed memories. The written distances $d_1$, $d_2$ and $d_3$ are respectively read out by operating the address switch 56. The read out distances is applied to the second input 30-2 of the adder-subtractor 30.

When the vehicle is at the starting point, the vehicle driver operates the preset switch to read out a signal indicative of the first distance at the output of the memory circuit 28'. Then the driver operates the clear switch 16 to clear signals stored in the up-down counter 14. Before leaving the starting point the vehicle driver operates the actual distance display switch 22 and the subtracting switch 38 so that the adder-subtractor 30 starts functioning as a subtractor. Since the signal S3 applied to the first input 30-1 of the adder-subtractor 30 from the up-down counter 14 represents zero, the adder-subtractor 30 produces an output signal $S_4$ indicative of the first distance $d_1$ which is then applied to the second input 24-2 of the selection circuit 24. Upon presence of a logic "1" signal at the control terminal 24-3 the selection circuit 24 permits transmission of the the signal $S_4$. The output signal $S_4$ of the selection circuit 24 is then fed to the second input 14-2 of the up-down counter 14 so that numerals correspond to the first distance $d_1$ are displayed at the third display portion 54 of the display circuit 48. As the vehicle moves, the up-down counter 14 produces an output signal $S_3$ indicative of the difference between the first distance $d_1$ and an actually travelled distance $D_2$ so that a remaining distance to the first objective point is displayed. The "REST" sign is also displayed at the same time. Therefore, the second embodiment of the trip meter functions in the same manner as the first embodiment until the vehicle reaches the first objective point. When the vehicle arrives at the first objective point, the actual distance display switch 22 may be operated again so as to display the actual distance $D_a$ between the starting point and the first objective point.

At the first objective point the address key 56 is operated to read out the second distance $d_2$. Before leaving for the second objective point the subtracting switch 38 is operated so that the remaining distance to the second objective point is displayed in the same manner. The trip meter may be used for the third distance $d_3$ in the same manner. Although the memory circuit 28' includes only three addressed memories, the number of the addressed memories may be increased if desired for storing more than three known distances.

For the return trip the trip meter may be utilized to display each of the remaining distances since the actual distance between the starting point and the first objective point, the actual distance between the first objective point and the second objective point, and the actual distance between the second objective point and the third objective point are respectively stored in the addressed memories.

Figure 3:
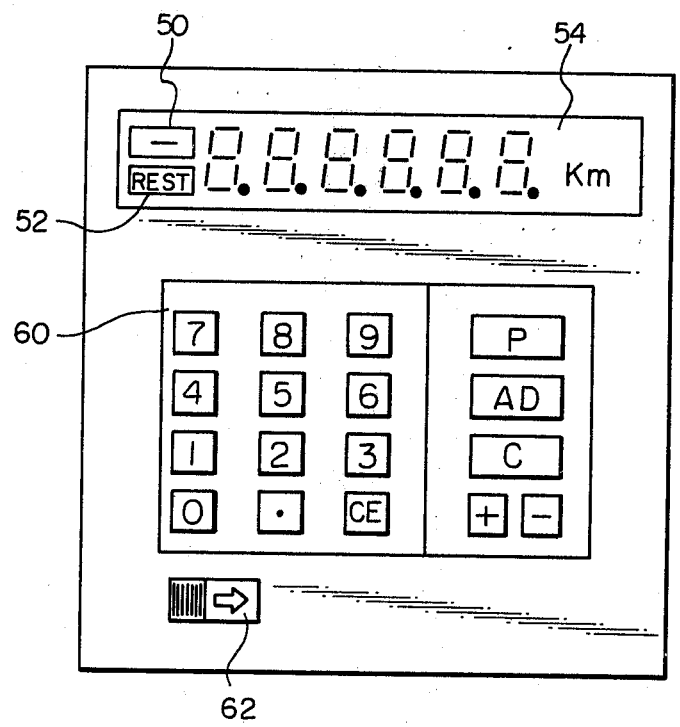
FIG. 3 shows a front elevation of an operating set of the trip meter according to the present invention.

FIG. 3 illustrates a front elevation of an operating set utilized for the first preferred embodiment of the trip meter according to the present invention. The operating set consists of first, second and third display portions 50, 52 and 54 and a keyboard panel 60. The first to third display portions 50, 52 and 54 are the same as those shown in FIGS. 1 and 2. The keyboard panel 60 includes ten keys 0, 1, 2, 3, 4, 5, 6, 7, 8 and 9 corresponding to numerals 0 to 9, a decimal key ".", a clear error key CE, a preset key "P", an actual distance display switch key "AD", a clear key "C", an adding switch key +, and a subtracting switch key —.

The ten keys 0 to 9 and the decimal key "." are used for encoding a known distance into a binary signal. The clear error key CE is used for cancelling erroneous signals produced by misoperation of the ten keys 0 to 9 and the decimal key. The preset key P, the actual distance display key AD, the clear key C, the adding key +, and the subtracting key — respectively correspond to the preset switch 20, the actual distance display switch 22, the clear switch 16, the adding switch 36, and the subtracting switch 38 which are shown in FIG. 1. A key lock switch 62 is disposed at the lower portion of the front panel of the operation set. The key lock switch 62 is utilized for disconnecting the various keys disposed on the keyboard 60 from the corresponding circuit. Therefore, when the key lock switch 62 is turned on, operations of the keys on the keyboard 60 do not influence the trip meter at all so that undesirable operations of the trip meter due to a careless touch of the keys is prevented.

The operating set is preferably mounted on the instrument panel of the vehicle so that the vehicle driver can readily operate the keys and see the display portions 50, 52 and 54. Although the operating set shown in FIG. 3 is for the first preferred embodiment of the trip meter, almost the same operating set may be utilized for the second preferred embodiment where the operating set for the second embodiment includes a key corresponding to the address switch 56 shown in FIG. 2.

The preferred embodiments of the trip meter are constructed by discrete elements as shown in FIGS. 1 and 2. However, if desired, the trip meter according to the present invention may be substituted by a micro computer. It is therefore, further understood by those skilled in the art that the foregoing descriptions are preferred embodiments of the disclosed trip meter and that various changes and modifications may be made in the invention without departing from the spirit and scope thereof.

What is claimed is:

1. An electronic trip meter for a vehicle, comprising:
   (a) first means for producing a first signal representative of a known distance;
   (b) second means for producing a second signal representative of a distance traveled by said vehicle;
   (c) third means for producing a third signal representative of the difference between the distances respectively represented by said second signal and another input signal;
   (d) fourth means selectively transmitting said first signal or a fourth signal to said third means as said another input signal;
   (e) fifth means for visually indicating the distance represented by said third signal;
   (f) sixth means for producing a fifth signal when the distance represented by said second signal exceeds the distance represented by said another input signal;
   (g) seventh means for storing said another input signal;
   (h) eighth means for producing an output signal representative of the difference between the distance respectively represented by said third signal of said third means and said another input signal stored in said seventh means by subtracting the former from the latter upon absence of said fifth signal, and upon presence of said fifth signal the eighth means producing an output signal representative of the sum of the distances respectively represented by said third signal of said third means and said another input signal stored in said seventh means, said output signal of said eighth means being fed to said fourth means as said fourth signal; and
   (i) ninth means for controlling said third, fourth and seventh means to set said fourth signal into said third means and store said fourth signal into said seventh means in place of said first signal.

2. An electronic trip meter as claimed in claim 1, wherein said second means comprises a pulse generator for producing a pulse signal each time said vehicle travels over a predetermined unit distance.

3. An electronic trip meter as claimed in claim 2, wherein said third means comprises a presettable up-down counter responsive to said pulse signal fed from said pulse generator, said known distance being preset in said up-down counter, said up-down counter producing a signal indicative of a remaining distance to an objective point by subtracting an actually travelled distance indicated by the number of said pulses from said known distance when said actually travelled distance is below said preset distance, said up-down counter producing a signal indicative of an excess distance over said known distance by counting the number of said pulses from zero after said actually travelled distance equals said known distance.

4. An electronic trip meter as claimed in claim 3, wherein said sixth means comprises means for detecting an overflow of said up-down counter, the up count and down count functions of said up-down counter being controlled in response to the detection of said overflow.

5. An electronic trip meter as claimed in claim 3, further comprising manual switch means for controlling the up count and down count functions of said up-down counter.

6. An electronic trip meter as claimed in claim 1, further comprising clear means for clearing signals stored in said third means.

7. An electronic trip meter as claimed in claim 1, wherein said seventh means comprises memory means, and wherein said eighth means comprises an adder-subtractor.

8. An electronic trip meter as claimed in claim 7, wherein said memory means comprises a plurality of addressed memories for storing a plurality of known distances.

9. An electronic trip meter as claimed in claim 1, further comprising display means for displaying a sign which indicates that the distance displayed by said fifth means is a distance remaining to said objective point.

10. An electronic trip meter as claimed in claim 1, further comprising display means for indicating that said distance displayed by said fifth means is an excess distance.

11. An electronic trip meter for a vehicle, comprising:
   (a) encoding means for producing a first signal indicative of a known distance between a starting point and an objective point;
   (b) travelled distance sensing means for producing a second signal indicative of a distance actually travelled by said vehicle;
   (c) an up-down counter having a first input connected to said travelled distance sensing means, a second input, a clear terminal, a preset terminal, an up-down control terminal, an overflow terminal, and an output, said up-down counter producing a third signal in accordance with said second signal and a signal applied to said second input terminal thereof;

(d) a clear switch connected to said clear terminal of said up-down counter for clearing signals stored in said up-down counter when operated;
(e) a preset switch for producing an output signal when operated;
(f) a first OR gate having a first input, a second input connected to said preset switch, and an output connected to said preset terminal of said up-down counter;
(g) actual distance display switch for producing an output signal when operated;
(h) an AND gate having a first input connected to said actual distance display switch, a second input and an output connected to said first input of said first OR gate;
(i) a first flip-flop having set and rest terminals respectively connected to switches, and an output connected via a first NOT gate to said second input of said AND gate;
(j) selection circuit having a first input connected to said encoding means, a second input, a control terminal connected to said output of said AND gate and an output connected to said second input of said up-down counter, said selection circuit selectively permitting transmission of said first signal or a signal applied to said second input thereof in response to a signal applied to said control terminal thereof;
(k) a memory circuit having an input connected to said output of said selection circuit, a preset terminal connected to said output of said first OR gate, and an output;
(l) a second OR gate having first input, a second input connected to said output of said first flip-flop, and an output connected to said up-down control terminal of said up-down counter;
(m) a second flip-flop having a set terminal connected to said overflow terminal of said up-down counter, a reset terminal connected to said output of said AND gate, and an output connected to said first input of said second OR gate;
(n) an adder-subtractor having a first input connected to said output of said up-down counter, a second input connected to said output of said memory circuit, a first control terminal connected to said output of said AND gate, a second control terminal connected to said output of said second flip-flop, and an output connected to said second input of said selection circuit, said adder-subtractor producing a fourth signal indicative of either the difference between distances respectively represented by said first and third signals or the sum of the distances in response to signals applied to said first and second control terminals; and
(o) a display circuit having a first input connected to said output of said second flip flop, a second input connected via a second NOT gate to said output of said first flip-flop, and a third input connected to said output of said up-down counter, said display circuit displaying numerals indicative of a distance in accordance with said third signal, displaying a negative sign upon presence of a signal at the first input thereof, and displaying a sign which indicates that the numerals correspond to the remaining distance to the objective point upon presence of a signal at the second input thereof.

12. An electronic trip meter for a vehicle, comprising:

(a) encoding means for producing a plurality of first signals each of which is indicative of a known distance between two points;
(b) travelled distance sensing means for producing a second signal indicative of a distance actually travelled by said vehicle;
(c) an up-down counter having a first input connected to said travelled distance sensing means, a second input, a clear terminal, a preset terminal, an up-down control terminal, an overflow terminal, and an output, said up-down counter producing a third signal in accordance with said second signal and a signal applied to said second input terminal thereof;
(d) a clear switch connected to said clear terminal of said up-down counter for clearing signals stored in said up-down counter when operated;
(e) a preset switch for producing an output signal when operated;
(f) a first OR gate having a first input, a second input connected to said preset switch, and an output connected to said preset terminal of said up-down counter;
(g) actual distance display switch for producing an output signal when operated;
(h) an AND gate having a first input connected to said actual distance display switch, a second input and an output connected to said first input of said first OR gate;
(i) a first flip-flop having set and reset terminals respectively connected to switches, and an output connected via a first NOT gate to said second input of said AND gate;
(j) selection circuit having a first input connected to said encoding means, a second input, a control terminal connected to said output of said AND gate and an output connected to said second input of said up-down counter, said selection circuit selectively permitting transmission of said first signal or a signal applied to said second input thereof in response to a signal applied to said control terminal thereof;
(k) a memory circuit having a plurality of addressed memories, a preset terminal connected to said output of said first OR gate, and an address terminal; each of said addressed memories having an input connected to said output of said selection circuit and an output, each of said addressed memories being enabled in accordance with a signal applied to said address terminal;
(l) an address switch for producing a plurality of signals to select one of the said addressed memories;
(m) a second OR gate having first input, a second input connected to said output of said first flip-flop, and an output connected to said up-down control terminal of said up-down counter;
(n) a second flip-flop having a set terminal connected to said overflow terminal of said up-down counter, a reset terminal connected to said output of said AND gate, and an output connected to said first input of said second OR gate;
(o) an adder-subtractor having a first input connected to said output of said up-down counter, a second input connected to said outputs of said addressed memories contained in said memory circuit, a first control terminal connected to said output of said AND gate, a second control terminal connected to said output of said second flip-flop, and an output connected to said second input of said selection circuit, said adder-subtractor producing a fourth signal indicative of either the difference between distances respectively represented by said first and third signals or the sum of the distances in response to signals applied to said first and second control terminals; and (p) a display circuit having a first input connected to said output of said second flip flop, a second input connected via a second NOT gate to said output of said first flip-flop, and a third input connected to said output of said up-down counter, said display circuit displaying numerals indicative of a distance in accordance with said third signal, displaying a negative sign upon presence of a signal at the first input thereof, and displaying a sign which indicates that the numerals correspond to the remaining distance to the objective point upon presence of a signal at the second input thereof.

13. A method of supplying a vehicle driver with distance information, comprising the steps of:

(a) producing a plurality of first signals respectively representative of a plurality of known distances of legs of a predetermined travelling course at a starting point of said course, said first leg being defined by said starting point and a first objective point and remaining legs being defined by subsequent objective points along said predetermined course;

(b) storing said first signals;

(c) producing a second signal representative of a distance actually travelled by said vehicle travels;

(d) subtracting the actually travelled distance from said known distance of said first leg for obtaining the distance remaining to said first objective point;

(e) visually indicating said remaining distance;

(f) detecting whether said actually travelled distance is greater than said known distance of said first leg or not;

(g) visually indicating that said remaining distance is of negative value when said actually travelled distance exceeds said known distance of said first leg before said vehicle reaches said first objective point;

(h) subtracting said remaining distance from said known distance of said first leg when said actually travelled distance is less than said known distance of said first leg to obtain the actual distance of said first leg;

(i) adding said remaining distance to said known distance of said first leg when said actually travelled distance is greater than said known distance of said first leg at said first objective point to obtain the actual distance of said first leg;

(j) storing said actual distance of said first leg in place of said known distance of said first leg;

(k) repeating said steps of (d) to (j) for the following legs until the vehicle reaches the last objective point of said predetermined travelling course;

(l) subtracting the actually travelled distance from said actual distance of the last leg for obtaining the distance remaining to the objective point separating said last leg and the second last leg on the way back to said starting point from said last objective point in a return trip along said predetermined course;

(m) visually indicating said second mentioned remaining distance; and (n) repeating said steps of (l) and (m) for the remaining legs until the vehicle returns to said starting point.

* * * * *